(12) United States Patent
Blasak da Fonseca et al.

(10) Patent No.: US 10,938,849 B2
(45) Date of Patent: Mar. 2, 2021

(54) AUDITING DATABASES FOR SECURITY VULNERABILITIES

(71) Applicant: Dell Products L. P., Round Rock, TX (US)

(72) Inventors: Fabio Miguel Blasak da Fonseca, Porto Alegre (BR); Tiago Fatturi de Souza, Gravatai (BR)

(73) Assignee: Dell Products L.P., Round Rock, TX (US)

( * ) Notice: Subject to any disclaimer, the term of this patent is extended or adjusted under 35 U.S.C. 154(b) by 401 days.

(21) Appl. No.: 15/800,378

(22) Filed: Nov. 1, 2017

(65) Prior Publication Data

US 2019/0132349 A1    May 2, 2019

(51) Int. Cl.
*H04L 29/06* (2006.01)
*G06F 21/57* (2013.01)
*G06F 9/06* (2006.01)
*H04L 29/08* (2006.01)
*G06F 16/24* (2019.01)
*G06F 16/25* (2019.01)

(52) U.S. Cl.
CPC .......... *H04L 63/1433* (2013.01); *G06F 9/06* (2013.01); *G06F 16/24* (2019.01); *G06F 16/252* (2019.01); *G06F 21/577* (2013.01); *H04L 63/20* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 8,272,061 B1 * | 9/2012 | Lotem | ................. | H04L 63/1433 726/25 |
| 9,363,149 B1 * | 6/2016 | Chauhan | ................. | H04L 41/22 |
| 2008/0040790 A1 * | 2/2008 | Kuo | ...................... | G06F 21/604 726/12 |
| 2013/0347116 A1 * | 12/2013 | Flores | ................. | H04L 63/1433 726/25 |
| 2014/0165204 A1 * | 6/2014 | Williams | ............... | H04L 63/02 726/25 |

(Continued)

OTHER PUBLICATIONS

Bhosale, Karuna S. et al. The distributed denial of service attacks (DDoS) prevention mechanisms on application layer. 2017 13th International Conference on Advanced Technologies, Systems and Services in Telecommunications (TELSIKS). https://ieeexplore.ieee.org/stamp/stamp.jsp?tp=&arnumber=8246247 (Year: 2017).*

(Continued)

*Primary Examiner* — Jeremiah L Avery
(74) *Attorney, Agent, or Firm* — Campbell Stephenson LLP (57) ABSTRACT

Disclosed herein are methods, systems, and processes to audit databases for security vulnerabilities. A server connects to a database and retrieves security information indicating security vulnerabilities associated with the database. A scanning program scans the database to identify the security vulnerabilities by executing subprograms stored in the database. The server accesses the security information using stored program units stored in the database, and stores the security information that identifies the security vulnerabilities in a repository database.

20 Claims, 9 Drawing Sheets

(56) References Cited

U.S. PATENT DOCUMENTS

| | | | |
|---|---|---|---|
| 2015/0040229 A1* | 2/2015 | Chan | G06F 21/577 |
| | | | 726/25 |
| 2015/0163199 A1* | 6/2015 | Kailash | H04L 63/1425 |
| | | | 726/11 |
| 2019/0098032 A1* | 3/2019 | Murphey | G06F 16/951 |

OTHER PUBLICATIONS

El Hajj, Farid. Multi-agent system vulnerability detector for a secured E-learning environment. 2016 Sixth International Conference on Digital Information Processing and Communications (ICDIPC). https://ieeexplore.ieee.org/stamp/stamp.jsp?tp=&arnumber=7470802 (Year: 2016).*

* cited by examiner

AUDITING DATABASES FOR SECURITY VULNERABILITIES

FIELD OF THE DISCLOSURE

This disclosure relates to data security in database computing environments. In particular, this disclosure relates to gathering, evaluating, and tracking security vulnerabilities applicable to databases.

DESCRIPTION OF THE RELATED ART

A database is a data structure managed by a database management system (DBMS) program that organizes a collection of data. Companies, businesses, and/or organizations use various databases and database applications to manage and provision mission critical data (e.g., to facilitate electronic commerce, financial transactions, and the like). Therefore, protecting databases from malicious attacks is an important business priority.

Database auditing involves monitoring and recording configured database actions from database users and non-database users to ensure database security and integrity. Auditing a company's databases can improve business operations and safeguard data integrity. A database administrator can audit individual database actions (e.g., actions to identify combinations of data that include a certain user name, application, or time stamp, the type of database command(s) executed, among other actions).

Unfortunately, manually auditing databases can lead to mistakes and misuse associated with the databases, as well as, the possibility of malicious action directed to the databases (e.g., by an outside actor). For example, failure to maintain or operate a database as required can lead to accidental disclosure of sensitive data, abuse of user and account privileges, and the like. In addition, failure to implement and maintain appropriate and adequate database security can lead to data theft (e.g., as the result of malicious attacks, and other such security vulnerabilities) or other types of problems such as Denial-of-Service (DoS) attacks.

SUMMARY OF THE DISCLOSURE

Disclosed herein are methods, systems, and processes to perform auditing of databases to identify, track, and take security action against security vulnerabilities applicable to the databases. One such method involves connecting, by a server, to a database, retrieving from the database, security information indicating security vulnerabilities associated with the database, scanning, by a scanning program, the database to identify the security vulnerabilities, executing, by the scanning program, subprograms stored in the database, accessing, by the subprograms, the security information using stored program units stored in the database, and storing the security information that identifies the security vulnerabilities in a repository database.

In one embodiment, a stored program unit is used to retrieve a portion of the security information from the database and the portion of the security information is associated with a security vulnerability. In this example, the portion of the security information includes, but is not limited to, privilege escalation data, Structural Query Language (SQL) injection data, Transparent Network Substrate (TNS) poison data, system package data, user account data, or database auditing data.

In another embodiment, the method involves connecting, by the server, to another database, retrieving from the another database, by executing the scanning program, another security information indicating the security vulnerabilities associated with the another database, and storing the another security information in the repository database.

In some embodiments, the scanning program is executed by a web application executing on the server, and the repository database is accessible via a web interface implemented by the server. In these embodiments, the scanning program executes a single server process facilitated by an application server layer provided by a web server implemented on the server, and the single server process includes stored program unit commands to enable the subprograms to access the security information using the stored program units stored in the database.

In other embodiments, the method executes the scanning program using the web application to scan the databases for the security vulnerabilities.

In certain embodiments, a subprogram is a procedure or a function that includes parameters with differing values, and the stored program unit is a procedure, a function, or a package that includes label security privileges associated with the security information.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Databases implemented in corporate and business computing environments are typically subject to operational and security requirements. For example, government regulations may require businesses to audit access to corporate information and produce reports detailing person(s) who may (or who may have had) access to sensitive information. Auditing an enterprise's databases is a prudent practice and improves business operations and safeguards data. However, the ability to determine when databases have been accessed (and by whom), and whether or not compromises have been made to data integrity is an important business and technical consideration.

Auditing enterprise databases is particularly challenging because of heightened expectations to protect and safeguard private data (e.g., heath records, and the like), while at the same time providing secure access to personal information. In today's data-driven marketplace, increased data access of corporate and business data by employees, customers, partners, and other individuals and/or entities has resulted in higher volumes of sensitive data being captured and maintained electronically. Therefore, implementing suitable privacy and security policies is an important step to secure databases.

It should be noted that in some situations, authorized users may access data inadvertently, and flaws in database policy and security implementation can introduce security vulnerabilities, enablement of accidental database access, and/or unintended databases changes. Therefore, database auditing can be implemented to monitor and record configured databases actions from database users and non-database users. For example, a database administrator can audit individual database actions (e.g., actions to identify combinations of data that include a certain user name, application, or time stamp, the type of database command(s) executed, among other actions). Database auditing can benefit from a specific database security tool to assist database administrators with database security assessments by implementing the proactive gathering, analyzing, and tracking of security data to secure a database environment, while at the same time identifying security risks related to one or more security vulnerabilities.

Some security vulnerabilities applicable to databases include phishing, Structure Query Language (SQL) injection, and data exfiltration, among others. Phishing is a method of electronic mail (e-mail) fraud where a perpetrator sends out legitimate looking emails in an attempt to gather personal and financial information from recipients. Typically, the messages appear to arrive from well-known and trustworthy websites. SQL injection is a technique used to take advantage of non-validated input vulnerabilities to pass database commands through a web application for execution by a back-end database. Attackers take advantage of the fact that computer programmers often chain together database commands with user-provided parameters, and embed malicious database commands inside these parameters. By doing so, an attacker can execute arbitrary database queries and/or commands on a database server (e.g., using a web application). Data exfiltration is the unauthorized copying, transfer, or retrieval of data from a computer or server and can be performed over networks such as the Internet. Data exfiltration is also called data extrusion, data exportation, or simply data theft. It should be noted that databases may be exposed to, and this disclosure contemplates, several other security vulnerabilities in addition to phishing, SQL injection, and/or data exfiltration.

Inside a database, a layer of protection can include monitoring a database by obtaining advanced privileges from a basic user account and generating heavy query statements test database performance. Outside a database, the layer of protection can include monitoring network traffic and tracking sensitive information from user transactions performed over the network. It would be preferable to have a unified technical security solution that implements such a database layer to gather, evaluate, and track information to identify security vulnerabilities in database environments (e.g., a database abstraction layer (DBAL) and/or a single instance application programming interface (API) which unifies communication between a web application and databases). Such a solution can provide, among other benefits, an automatic execution method, proactive security recommendations, third-party API support, self-assessment features, and/or methods to defend against hacker attacks.

Disclosed herein are methods, systems, and processes to perform auditing of databases to identify, track, and take security action against security vulnerabilities applicable to the databases.

Example Database Server Device

Figure 1:
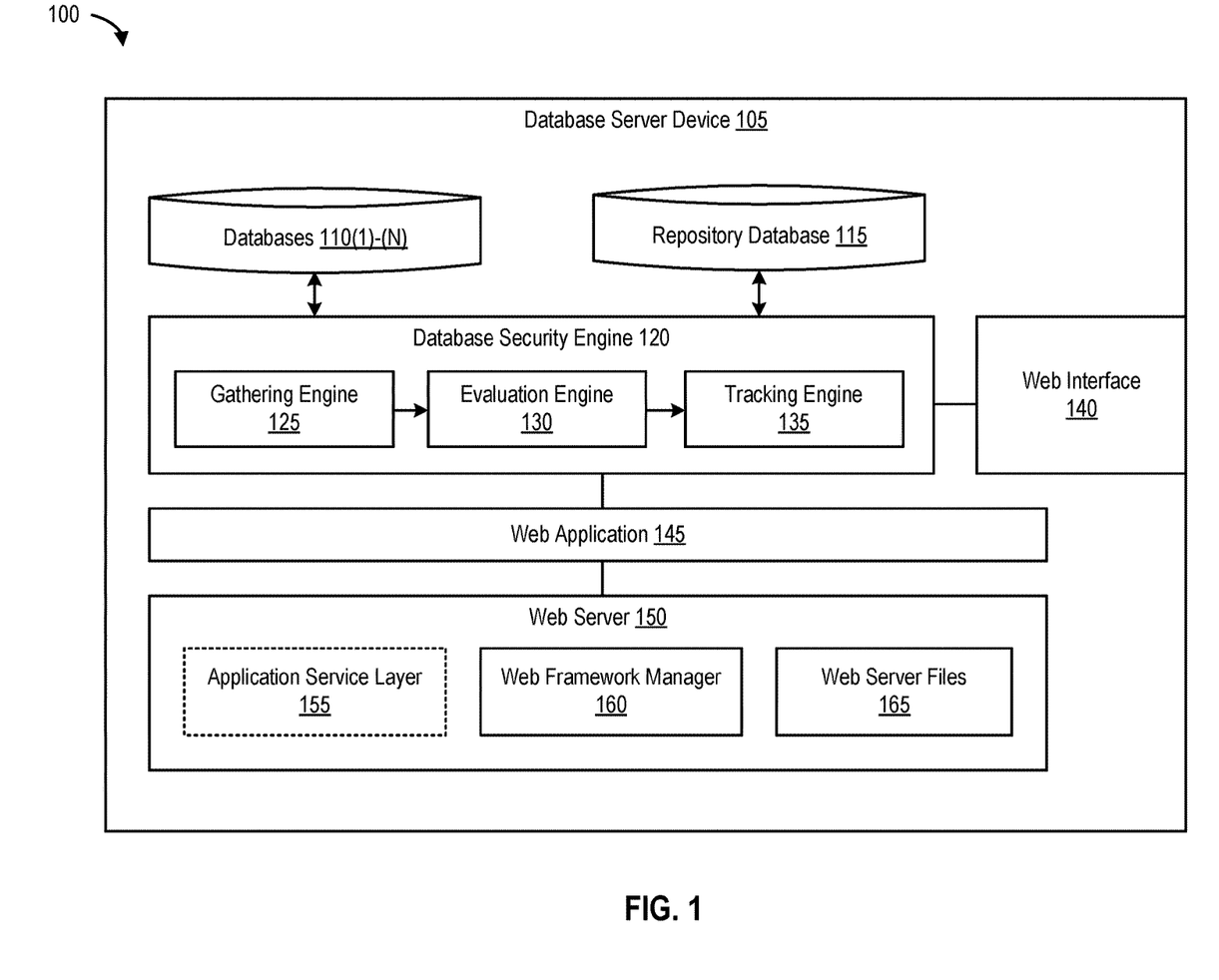
FIG. 1 is a block diagram 100 illustrating a database server device, according to one embodiment of the present disclosure.

FIG. 1 is a block diagram 100 illustrating a database server device, according to one embodiment. As shown in FIG. 1, a database server device 105 includes databases 110(1)-(N) and a repository database 115, and implements at least a database security engine 120, a web interface 140, a web application 145, and a web server 150. Database server device 105 can be any of a variety of different types of computing devices, including a server, personal computing device, laptop computer, net book, personal digital assistant, cellular phone, or the like.

Databases 110(1)-(N) include multiple databases implemented in a database environment to manage various types of data. Database 110(1)-(N) can also record and manage security information associated with databases 110(1)-(N). Repository database 115 is a database used to gather, evaluate, and track security data or portions of security data applicable to database 110(1)-(N). Data managed by databases 110(1)-(N) and repository database 115 can be stored on one or more storage devices. Web interface 140 manages the computing interaction between one or more users and software executing on web server 150. For example, web interface 140 can include a web browser and a web page that the web browser downloads and renders. Web interface 140 can also provide a programming connection to the Internet and can be used by one or more users (e.g., database administrators, security administrators, and the like) to store, secure, retrieve, and share documents.

Web application 145 is a client-server computer program in which web interface 140 runs in a web browser. In one embodiment, web application 145 is created using web framework manager 160 (e.g., using a procedural language (PL) like the PL/SQL programming language, among others). Web application 145 created using web framework manager 160 is a set of stored subprograms that interact with web interface 140 using one or more application protocols such as hypertext transfer protocol (HTTP). In this example, a set of interlinked, dynamically generated hypertext markup language (HTML) pages form the user interface of a web application (e.g., web interface of 140 of web application 145). Web application 145 is implemented by web server 150. In one embodiment, web server 150 may be implemented separately from and externally to database server device 105.

Web server 150 further implements an application service layer 155 and a web framework manager 160, and includes web server files 165. In one embodiment, web server 150 is a HTTP server and provides a HTTP listener to handle incoming requests and route them to an appropriate processing utility, modules to implement and extend the functionality of the HTTP server, and a persistent runtime environment embedded in the HTTP server. In another embodiment, web server 150 can be a proxy server, both forward and reverse. Unfortunately, scripts written in certain programming languages (e.g., in CGI PERL to produce web pages dynamically) are not optimal for accessing databases.

Therefore, in some embodiments, using web framework manager 160 to access and retrieve information from subprograms stored in database 110(1)-(N) provides improved power and flexibility of database processing. In this example, and from a database perspective, web framework manager 160 provides the PL/SQL programming language and the Bash shell programming language to users of database server device 105 who wish to access security data from databases 110(1)-(N). Web framework manager 160 provides database server device 105 the capability to support a given procedural language statements within the language's syntax, and thus permits multiple procedural languages to run within the same server process, providing efficient database processing. Application service layer 155 provides a single unified database layer through which web server 150 communicates with database security engine 120, web interface 140, databases 110(1)-(N), and/or repository database 115 to gather, evaluate, and track security data associated with database 110(1)-(N).

Web server files 165 include files used to generate and manage a single server instance. For example, and from a server perspective, web server files 165 can include Bash shell scripts used by web framework manager 160 and application service layer 155 for the immediate execution of a single command and to receive corresponding feedback. A script can include a list of database commands or even a single database command, in addition to functions, loops, conditional constructs, and the like. Application service layer 155, web framework manager 160, and web server files 165 can be utilized by database server device 105 to retrieve security data processed using database security engine 120 from external targets such as databases 110(1)-(N) via web application 145 and web interface 140.

Example System to Retrieve Security Data from Databases

Figure 2:
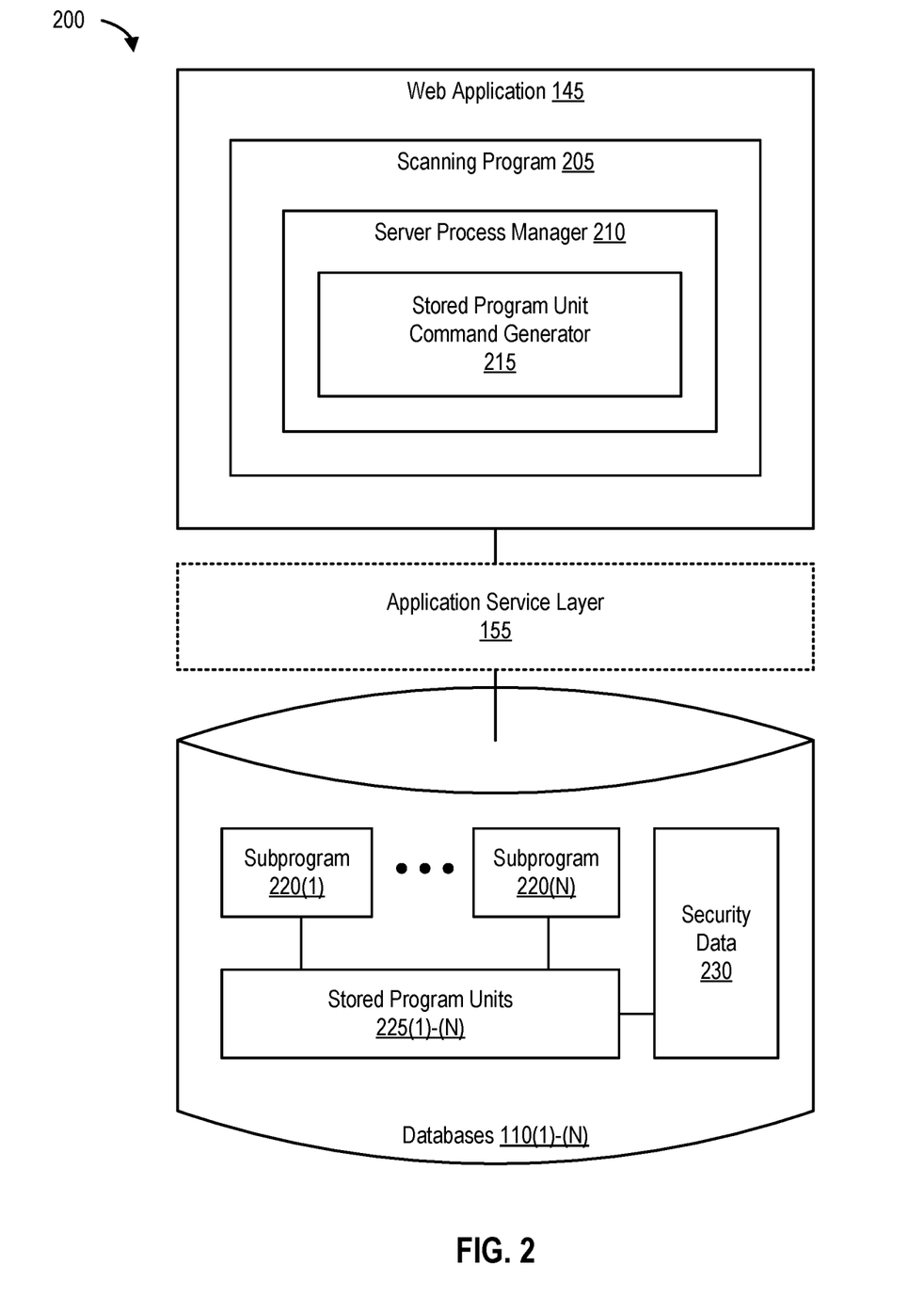
FIG. 2 is a block diagram 200 illustrating a web application and a scanning program, according to one embodiment of the present disclosure.

FIG. 2 is a block diagram 200 illustrating a web application and a scanning program, according to one embodiment. Web application 145 implements at least a scanning program 205 and a server process manager 210. Server process manager 210 further implements a stored program unit command generator 215. In one embodiment, application service layer 155 provides a single instance API to communicatively and computationally couple web application 145 and databases 110(1)-(N). As shown in FIG. 2, databases 110(1)-(N) include subprograms 220(1)-(N) and stored program units 220(1)-(N), and maintain security data 230.

In some embodiments, subprogram 220(1) is either a procedure or a function. If subprogram 220(1) is a procedure, subprogram 220(1) can be used by database security engine 120 to perform an action associated with database 110(1) (e.g., to retrieve portions of security data from database 110(1)), and if subprogram is a function, subprogram 220(1) can be used by database security engine 120 to compute and return a value associated database 110(1) (e.g., when database 110(1) was last accessed, by whom, and the like). In one embodiment, subprograms 220(1)-(N) are PQ/SQL blocks that can be invoked repeatedly by web application 145 and/or database security engine 120. In this example, if subprogram 220(1) includes parameters, the values of these parameters can differ for each invocation of subprogram 220(1).

In certain embodiments, stored program units 225(1)-(N) are stored procedures, functions, or packages that have been granted one or more label security privileges (e.g., by a database administrator). Stored program units 225(1)-(N) can be used to allow users to perform privileged operations associated with databases 110(1)-(N) in a controlled manner (e.g., to retrieve portions of security data from databases 110(1)-(N)), or can be used to update several labels (e.g., to grant or remove security privileges). In one embodiment, stored program units 220(1)-(N) are compiled by web server 150 and stored inside one or more of databases 110(1)-(N). Stored program units 220(1)-(N) permit multiple databases scripts and/or queries to run within a single server process managed by server process manager 210 and executed via application service layer 155 made available by web server 150.

In one embodiment, database server device 105 connects to database 110(1) and retrieves security information indicating security vulnerabilities associated with database 110(1) from database 110(1). Scanning program 205 implemented by web application 145 then scans database 110(1) to identify the security vulnerabilities and executes one or more subprograms (e.g., subprograms 220(1)-(N)) stored in database 110(1). Database security engine 120 then accesses, using one or more stored program units 225(1)-(N), the security information stored in database 110(1), and stores the security information that identifies the security vulnerabilities in repository database 115.

In some embodiments, a stored program unit 225(1) is used to retrieve a portion of the security information (e.g., a portion of security data 230 associated with a security vulnerability) from database 110(1). In these embodiments, the portion of security data 230 includes, but is not limited to, privilege escalation data, SQL injection data, Transparent Network Substrate (TNS) poison data, system package data, user account data, or database auditing data. It should be noted that web application 145 can execute scanning program 205 on multiple databases to identify security vulnerabilities (e.g., to retrieve one or more portions of security data 230 applicable to databases 110(2)-(N)).

As shown in FIG. 2, scanning program 205 is executed by web application 145 executing on database server device 105. Repository database 115 is accessible via web interface 140 implemented by database server device 105 and/or web server 150. In one embodiment, server process manager 210 configures scanning program 205 to execute a single server process facilitated by application service layer 155 provided by web server 150 implemented on database server device 105. In this example, the single server process includes stored program unit commands generated by stored program unit command generator 215 to access security data 230 (or a portion thereof) using stored program units 225(1)-(N) stored in one or more of databases 110(1)-(N). In another embodiment, web server 150 is configured to implement application service layer 155, and web framework manager 160 provides support for multiple procedural programming languages (e.g., PL/SQL, and the like) to enable implementation of stored program unit commands to retrieve specific portions of security data 230 from databases 110(1)-(N).

In certain embodiments, web application 145 implements a set of stored subprograms (e.g., a set of programmable procedures and/or functions) that interact with web interface 140 using web server 150. For example, a user of database server device 105 can visit a web page, follow a hypertext link, or submit data in a form, which causes web interface 140 (e.g., a web browser) to send a service request (e.g., a HTTP request for a uniform resource locator (URL)) to web server 150. Web server 150 then calls a stored subprogram (e.g., subprogram 220(1)) on database 110(1) according to data encoded in the URL. The data in the URL takes the form of parameters to be passed to subprogram 220(1)). The stored subprogram then invokes other subprograms in web framework manager 160 (e.g., pre-programmed procedures and/or functions such as stored program units 225(1)-(N)). It should be noted that subprograms (e.g., HTP.Print, and the like) can generate web pages dynamically, and the generated web page can vary depending on database contents and input parameters. At this point, subprogram 220(1) passes the dynamically generated page to web server 150, and web server 150 delivers the page to the user of database server device 105 (e.g., using web interface 140).

Example Database Security Engine

Figure 3:
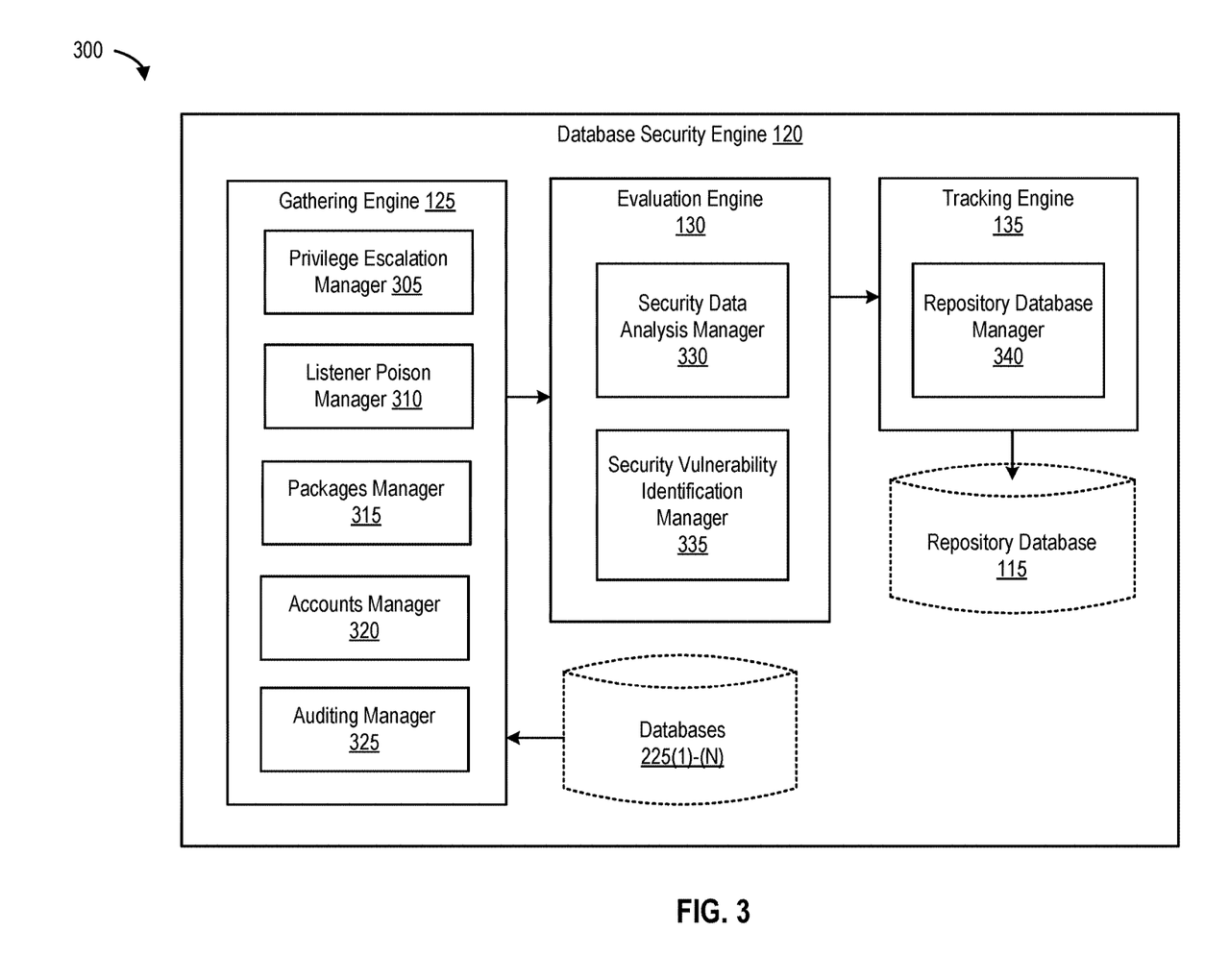
FIG. 3 is a block diagram 300 of a database security engine, according to one embodiment of the present disclosure.

FIG. 3 is a block diagram 300 of a database security engine, according to one embodiment. As shown in FIGS. 1 and 3, database security engine 120 includes a gathering engine 125 to gather security data 230 or one or more portions thereof from databases 110(1)-(N), an evaluation engine 130 to evaluate and analyze the gathered security data, and a tracking engine 135 to track the gathered and evaluated security data.

Gathering engine 125 includes at least a privilege escalation manager 305, a listener poison manager 310, a packages manager 315, an accounts manager 320, and an auditing manager 325. In certain embodiments, privilege escalation manager 305 manages privilege escalation attacks associated with databases 110(1)-(N) by identifying one or more user accounts with privileges used to maliciously and/or even inadvertently access databases 110(1)-(N). For example, privilege escalation manager 305 can used by scanning program 205 to execute a subprogram stored in database 110(1) and configured to identify and track the privilege escalation data from database transactions and/or modifications associated with one or more user and/or group accounts (e.g., the granting of additional and/or unusual access privileges, and the like) and to retrieve privilege escalation data from database 110(1). In this example, the subprogram can invoke one or more stored program units compiled by database server device 105 and stored in databases 110(1)-(N) (e.g., to run within the same server process managed by server process manager 310 to identify one or more user malicious accounts).

In some embodiments, listener poison manager 310 retrieves Transparent Network Substrate (TNS) poison data (e.g., as the result of a man-in-the-middle attack) from databases 110(1)-(N) to validate database network settings of databases 110(1)-(N), packages manager 315 retrieves system package data from databases 110(1)-(N) to validate source code against factory defaults (e.g., SYS and SYSTEM packages), accounts manager 320 retrieves user account data from databases 110(1)-(N) to validate account settings and to identify highly privileged accounts, and auditing manager retrieves database auditing data from databases 110(1)-(N) to validate current database auditing configurations. In these examples, repository database 115 acts as a centralized repository to track the foregoing security data. Scanning program 205 can implement gathering engine 125 based on a custom-defined frequency to notify security administrators of security issues associated with databases 110(1)-(N).

Evaluation engine 130 includes at least a security data analysis manager 330 and a security vulnerability identification manager 335 to evaluate the security data collected by gathering engine 125 and identify one or more security vulnerabilities (e.g., a privilege escalation incident, and the like) that need to be registered on repository database 115. Tracking engine 135 includes a repository database manager 340 that records, stores, and/or registers one or more security vulnerabilities identified by evaluation engine 130 and collected by gathering engine 125 to repository database 115.

In some embodiments, database security engine 120 utilizes subprograms and stored program units stored in databases 110(1)-(N) to retrieve privilege escalation data from security data 230 (e.g., security data or a portion thereof related to and/or pertaining to one or more database transactions, queries and/or scripts implemented to CREATE PUBLICSYNONYM, CREATE ANY INDEX, CREATE ANY PROCEDURE, EXECUTE ANY PROCEDURE, RESTRICT JAVA USAGE, CREATE ANY JOB, BECOME USER, EXP_FULL_DATABASE, IMP_FULL_DATABASE, UTL_FILE, ANALYZE ANY, CREATE DIRECTORY, SELECT ANY DICTIONARY, SELECT CATALOG ROLE, EXECUTE CATALOG LOG, and/or PUBLIC PRIVILEGES).

In other embodiments, database security engine 120 executes subprograms and stored program units stored in databases 110(1)-(N) to retrieve TNS listener poison data stored in databases 110(1)-(N) (e.g., security data or a portion thereof related to and/or pertaining to a local/remote listener parameter check, Class of Secure Transport (COST), and/or Valid Node Checking Registration (VNCR)), and retrieve system data stored in databases 110(1)-(N) (security data or a portion thereof related to and/or pertaining to SYS and SYSTEM package validation using one or more hash values).

In certain embodiments, database security engine 120 executes subprograms and stored program units stored in databases 110(1)-(N) to retrieve user account data stored in databases 110(1)-(N) (e.g., .g., security data or a portion thereof related to and/or pertaining to a user profile check, an NT account revalidation, a high privileges validation, and/or password complexity), and retrieve database auditing data stored in databases 110(1)-(N) (e.g., to perform system operations auditing, access append only features on auditing files, and the like). It will be appreciated that the foregoing security data retrieved from databases 110(1)-(N) and stored in repository database 115 can be used to perform database PSU assessment (e.g., by validating whether the latest PSU patch has been applied to a given database).

In one embodiment, a user of database server device 105 can customize one or more notification groups and select which security vulnerabilities should generate an alert (e.g., privilege escalation data versus user account data). Tracking engine 135 can be configured to create one or more notification groups based on the security vulnerabilities identified by security vulnerability identification manager 335. Tracking engine 135 can also generate a customized report based on the various security vulnerabilities retrieved by gathering engine 125 and identified by evaluation engine 130.

Processes to Audit Databases for Security Vulnerabilities

Figure 4:
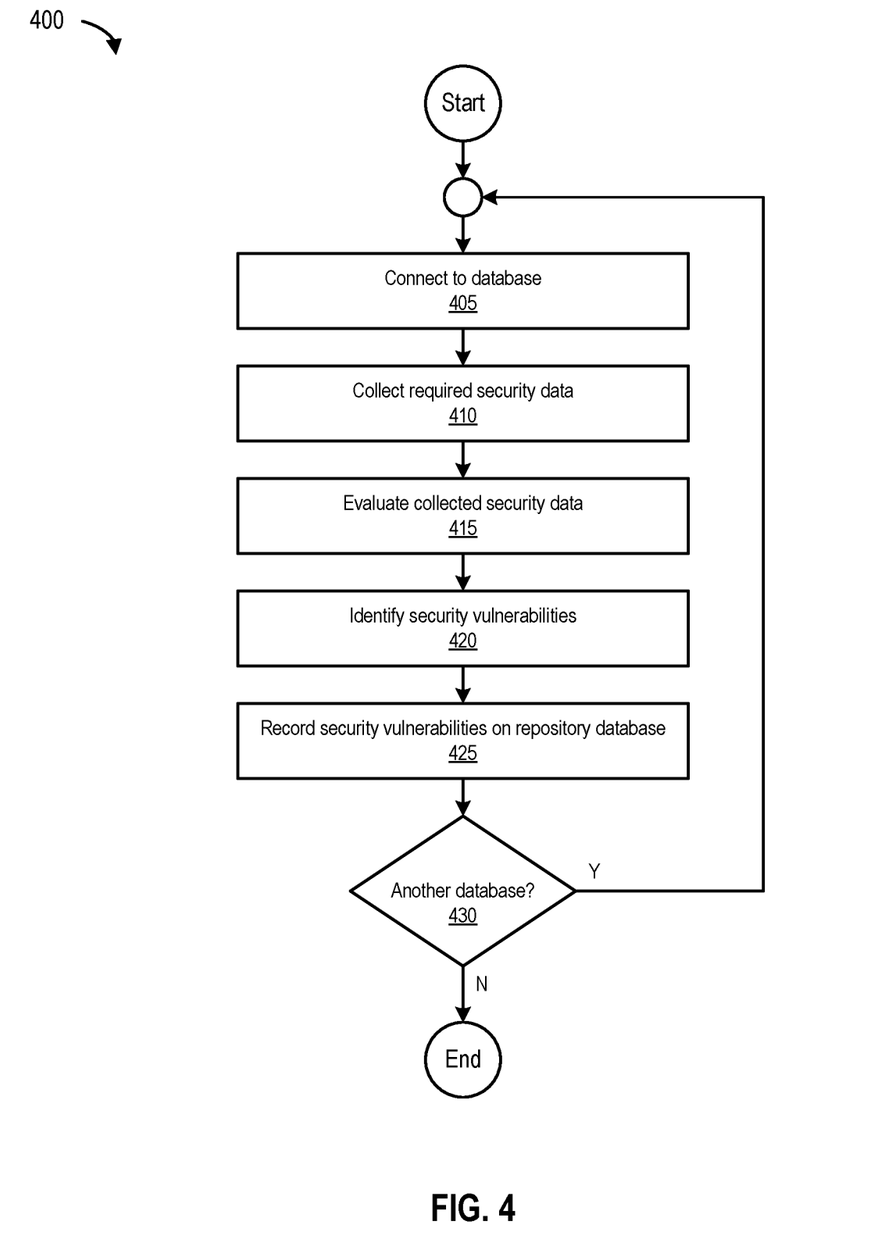
FIG. 4 is a flowchart 400 and illustrates a process to record security vulnerabilities on a repository database, according to one embodiment of the present disclosure.

FIG. 4 is a flowchart 400 and illustrates a process to record security vulnerabilities on a repository database, according to one embodiment. The process begins at 405 by connecting to a database (e.g., database server device 105 connecting to database 110(1)). At 410, the process collects required security data (e.g., using gathering engine 125), and at 415, evaluates the collected security data (e.g., using evaluation engine 130). At 420, the process identifies security vulnerabilities (e.g., using security vulnerability identification manager 335 and/or security data analysis manager 330). At 425, the process records security vulnerabilities on a repository database (e.g., tracking engine 135 records security data 230 or a portion thereof on repository database 115). At 430, the process determines if there is another database to scan (e.g., using scanning program 205). If there is another database to scan, the process loops to 405. Otherwise, the process ends.

Figure 5:
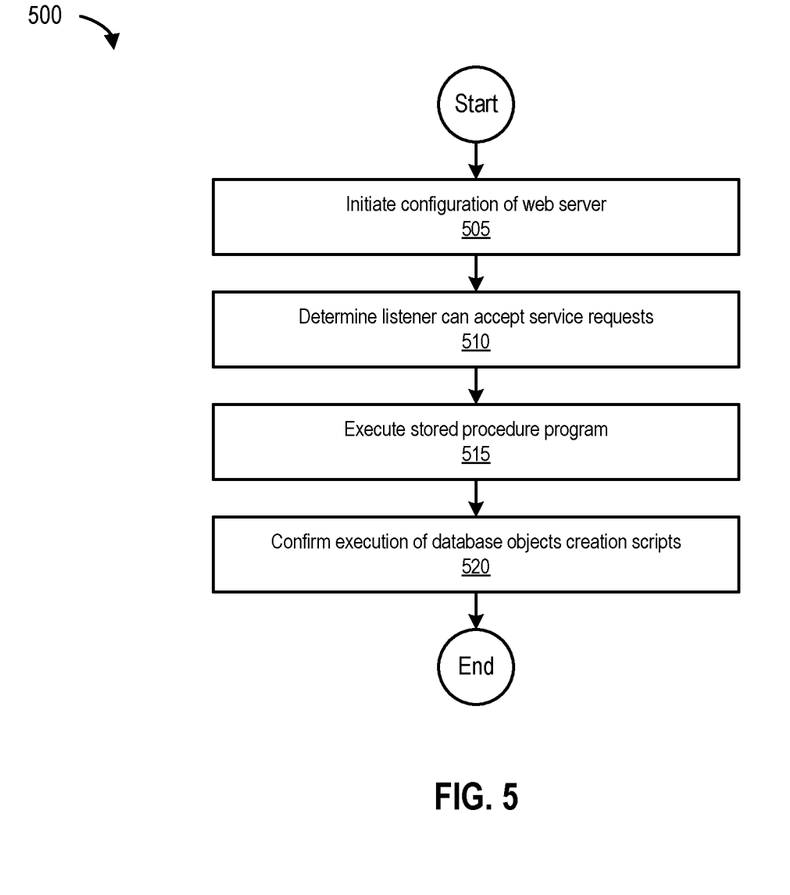
FIG. 5 is a flowchart 500 and illustrates a process to configure a web server, according to one embodiment of the present disclosure.

FIG. 5 is a flowchart 500 and illustrates a process to configure a web server, according to one embodiment. The process begins at 505 by initiating configuration of a web server (e.g., web server 150). At 510, the process determines whether a listener can accept service requests (e.g., whether a listener associated with web server 150 can accept HTTP requests; it should be noted that if a service has not started, the listener can be replaced in a parameter file and the database can be restarted with the listener). At 515, the process executes a stored procedure program (e.g., one or more of subprograms 220(1)-(N) that are associated with and that can further invoke stored program units 225(1)-(N)).

The process ends at 520 by confirming execution of database objects creation scripts (e.g., to create sequences section and tables section, indexes for database target, server target, notification groups, hacking methods, violation findings, critical patch, user notification group status, user notification group, and relationships section (which manages pre-compiled and newly-compiled security vulnerability-based relationships between stored program units and subprograms, for example)). The following illustrates an embodiment of an example security process flow for database security engine 120:

```
//Step1: Create or replace package
    pkg_initial_load AS
//Step2: Configure Notification Group Status
    add_userNotificationGroupStatus;
//Step3: Set up Database Target Status
    add_DBTargetStatus;
//Step4: Set up Server Target
    add_serverTargetStatus;
//Step6: Select Violation Finding(s)
    add_violationFindingStatus;
//Step7: Select Hack Method(s)
    add_hackMethodStatus;
//Step8: Configure Violation Finding Status
    add_violationFindingType;
//Step9: Load Package
    pkg_initial_load;
/
```

Figure 6:
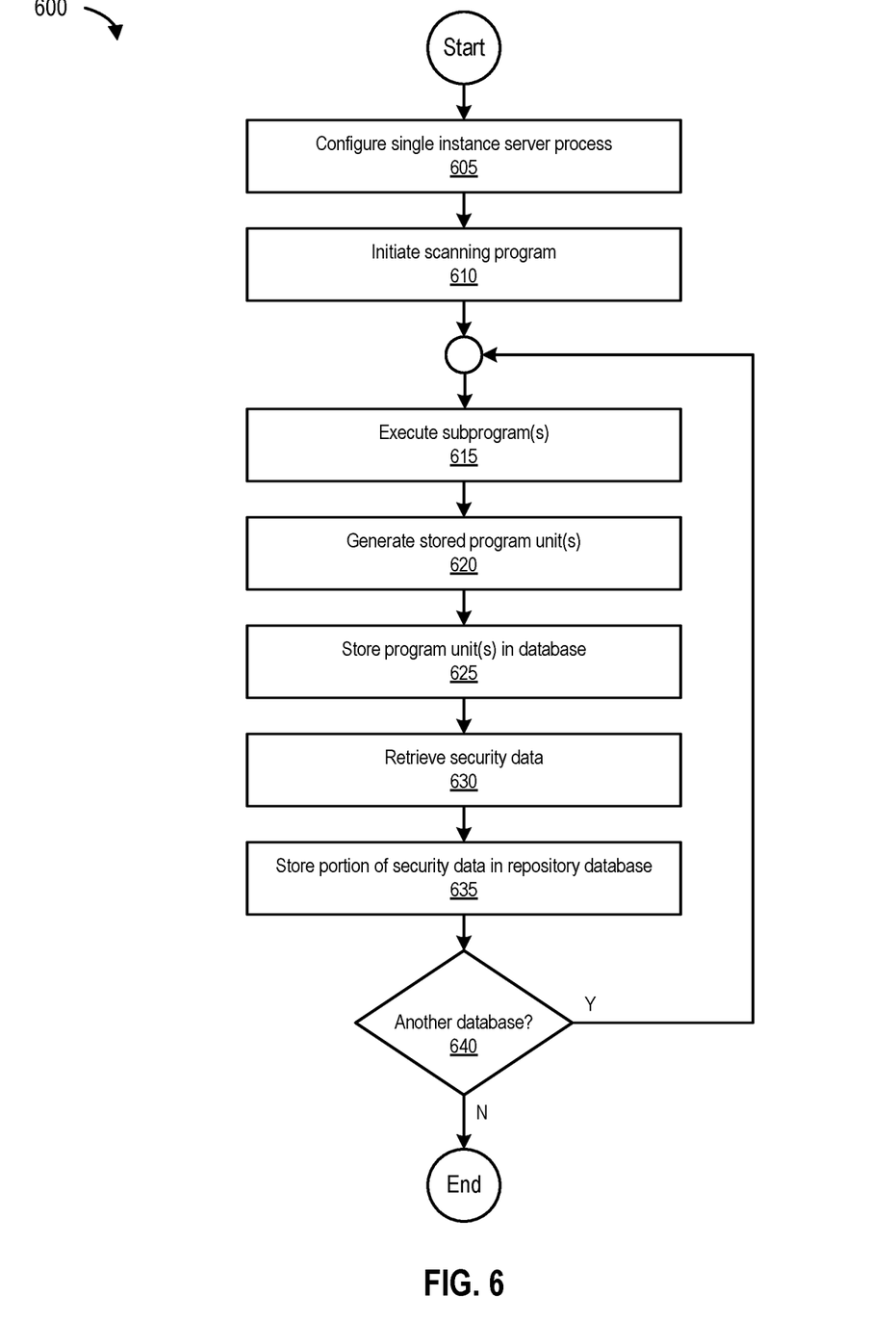
FIG. 6 is a flowchart 600 and illustrates a process to retrieve security data from a database, according to one embodiment of the present disclosure.

FIG. 6 is a flowchart 600 and illustrates a process to retrieve security data from a database, according to one embodiment. The process begins at 605 by configuring a single instance server process (e.g., using server process manager 210). At 610, the process initiates scanning program 205 and at 615, executes subprograms (e.g., subprograms 220(1)-(N)). At 620, the process generates stored program unit(s) (e.g., stored program units 225(1)-(5) based on one or more commands generated by stored program unit generator 215). At 625, the process stores the stored program unit(s) in the database (e.g., database 110(1)). At 630, the process retrieves security data (e.g., security data 230), and at 635 stores a portion of the security data in a repository database (e.g., repository database 115). At 640, the process determines if there is another database to scan (e.g., using scanning program 205). If there is another database to scan, the process loops to 605. Otherwise, the process ends.

Figure 7:
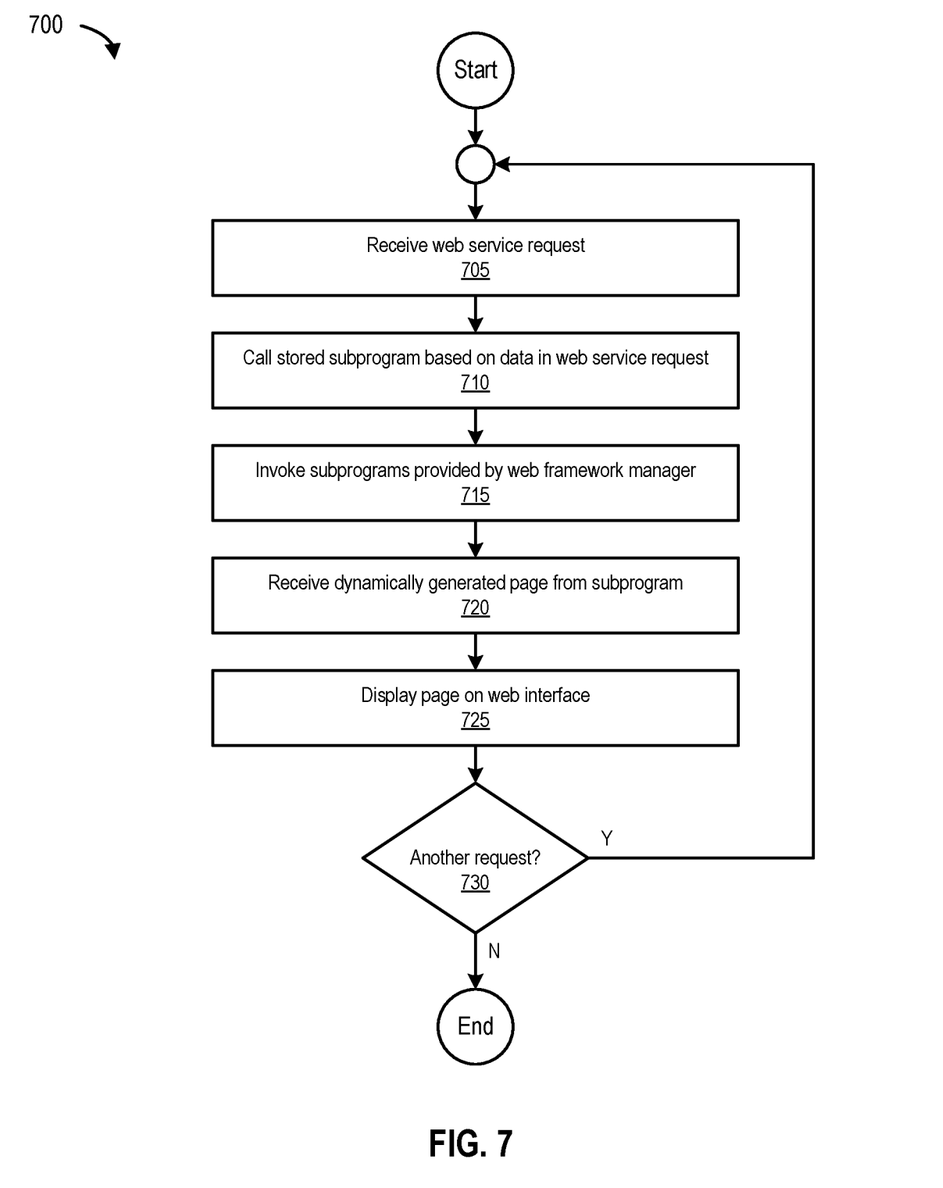
FIG. 7 is a flowchart 700 and illustrates a process to fulfill a web service request, according to one embodiment of the present disclosure.

FIG. 7 is a flowchart 700 and illustrates a process to fulfill a web service request, according to one embodiment. The process begins at 705 by receiving a web service request. At 710, the process calls a stored subprogram based on data in the web service request. At 715, the process invokes subprograms provided by a web framework manager (e.g., web framework manager 160). It should be noted that in some embodiments, stored program units may be subprograms invoked by other subprograms. For example, stored program unit 225(1) can be a separate but linked subprogram invoked by subprogram 220(1)). At 720, the process receives a dynamically generated page from the subprogram, and at 725, displays the page on a web interface (e.g., web interface 140). At 730, the process determines if there is another web service request (e.g., to retrieve additional security data from another database). If there is another web service request, the process loops to 705. Otherwise, the process ends.

In this manner, the methods, systems, and processes described and disclosed herein can be used to perform centralized non-intrusive auditing of databases to identify, track, and take security action against security vulnerabilities applicable to the databases without requiring third party solutions (both hardware and software) to be installed on source databases and without performing modifications to the databases (e.g., to sensitive configuration information, user data, log files, catalogues, and the like).

Example Computing Environment

Figure 8:
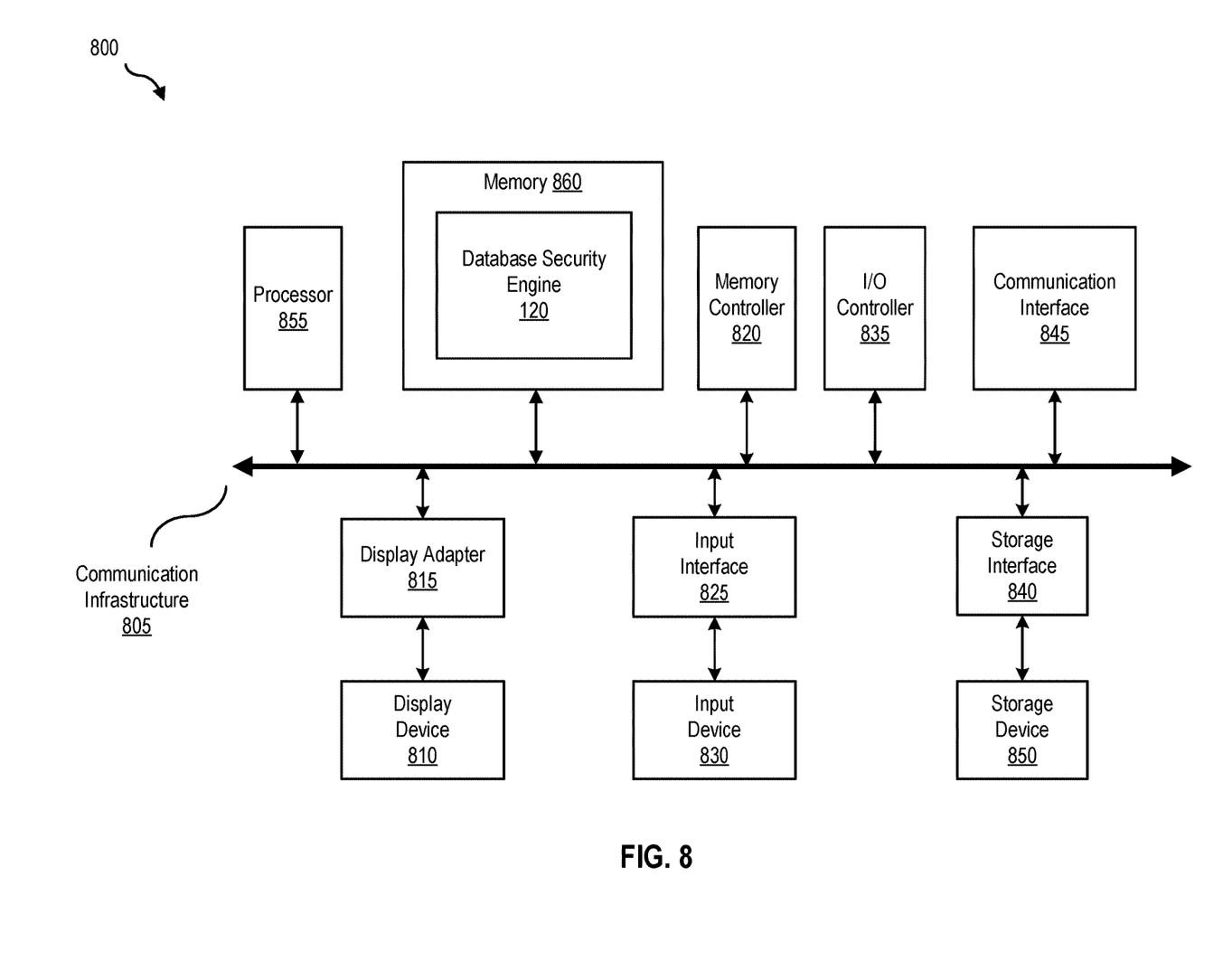
FIG. 8 is a block diagram 800 of a computing system, illustrating how database security engine can be implemented in software, according to one embodiment of the present disclosure.

FIG. 8 is a block diagram 800 of a computing system, illustrating how database security engine 120 can be implemented in software, according to one embodiment. Computing system 800 can include database server device 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes database security engine 120, computing system 800 becomes a special purpose computing device that is configured to audit databases for security vulnerabilities.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing database security engine 120 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data (e.g., in the form of databases 110(1)-(N) and/or repository database 115) and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in database server device 105. When executed by processor 855, a computer program loaded into computing system 800 may cause processor 855 to perform and/or be a means for performing the functions of one or more of the embodiments described/illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
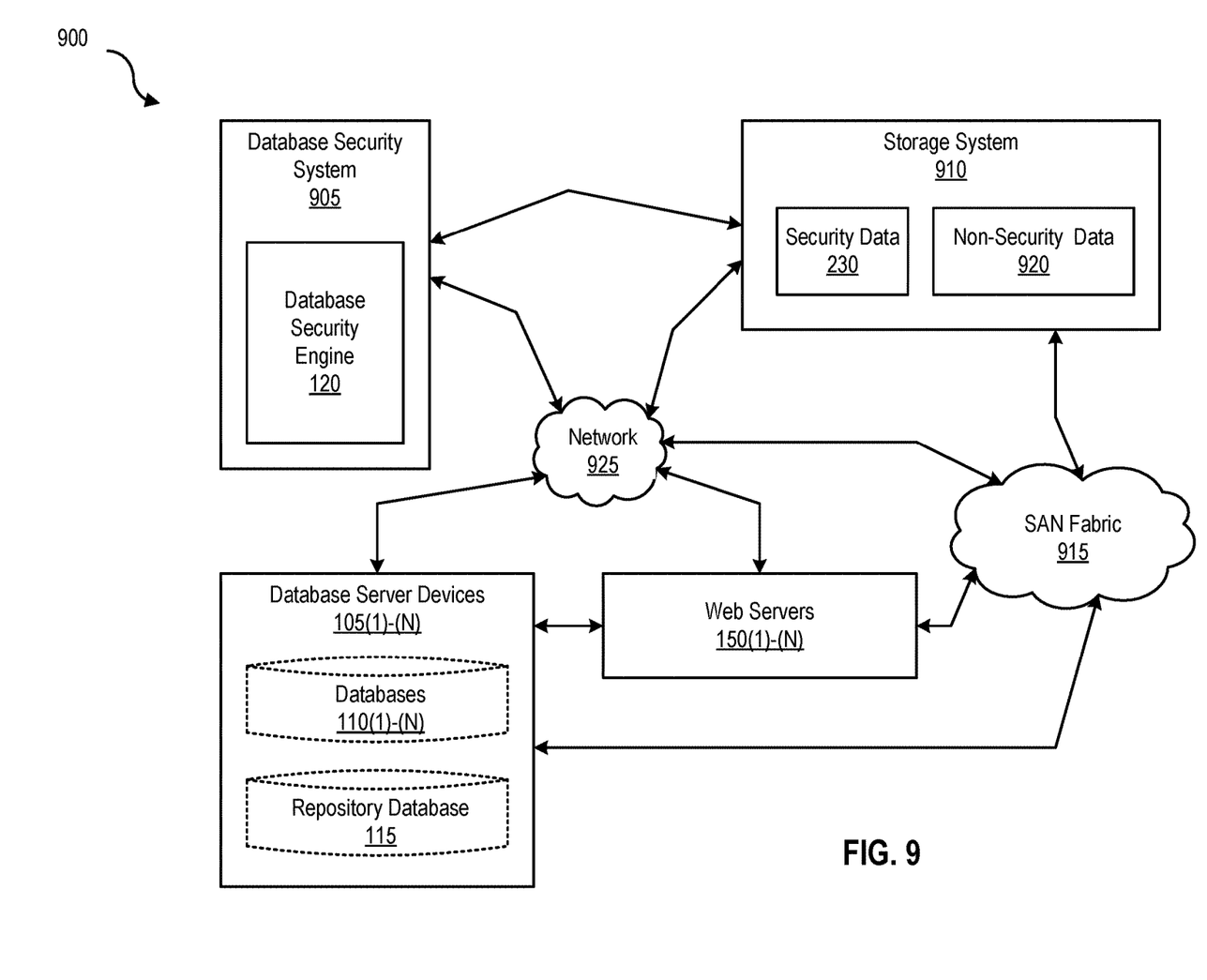
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with database server device 105 using Network File System (NFS), Server Message Block (SMB), or Common Internet File System (CIFS). Network 925 generally represents any type or form of computer network or architecture capable of facilitating communication between database server device 105, databases 110(1)-(N), repository database 115, and/or one or more computing devices (e.g., an external web server, and the like).

In certain embodiments, a communication interface, such as communication interface 845 in FIG. 8, may be used to provide connectivity between database server device 105, databases 110(1)-(N), repository database 115, and/or web server 150, and network 925. The embodiments described and/or illustrated herein are not limited to the Internet or any particular network-based environment. In some embodiments, network 925 can be a Storage Area Network (SAN). In other embodiments, database security engine 120 may be part of database server device 105, or may be separate. If separate, database server device 105 and the computing device database security engine 120 is implemented in (e.g., database security system 905) may be communicatively coupled via network 925.

In one embodiment, all or a portion of one or more of the disclosed embodiments may be encoded as a computer program and loaded onto and executed by database server device 105. All or a portion of one or more of the embodiments disclosed herein may also be encoded as a computer program, stored on database server device 105 or storage system 910, and distributed over network 925. In some examples, all or a portion of database security system 905 and/or database server devices 105(1)-(N) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment. In addition, one or more of the components described herein may transform data, physical devices, and/or representations of physical devices from one form to another. For example, database security engine 120 may transform the behavior of database security system 905 and/or database server device 105 to perform database auditing to identify security vulnerabilities.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
connecting, by a server, to a database of a plurality of databases;
retrieving from the database, security information indicating one or more security vulnerabilities associated with the database;
scanning, by a scanning program implemented in a web application that is hosted by a web server, the database to identify the one or more security vulnerabilities wherein
the scanning program is configured to execute a single server process facilitated by an application service layer on the web server,
the single server process includes stored program unit commands;
executing, by the scanning program, one or more subprograms stored in the database using the stored program unit commands;
invoking, by the one or more subprograms in the database, one or more stored program units in the database;
accessing, by the one or more subprograms, the security information using the one or more stored program units stored in the database based on the stored program unit commands; and
storing the security information in a repository database, wherein
the security information comprises the one or more security vulnerabilities.

2. The computer-implemented method of claim 1, wherein
a stored program unit of the one or more stored program units is used to retrieve a portion of the security information from the database, and
the portion of the security information is associated with a security vulnerability of the one or more security vulnerabilities.

3. The computer-implemented method of claim 2 wherein
the portion of the security information comprises privilege escalation data, Structural Query Language (SQL) injection data, Transparent Network Substrate (TNS) poison data, system package data, user account data, or database auditing data.

4. The computer-implemented method of claim 1, further comprising:
connecting, by the server, to a further database of the plurality of databases;
retrieving from the further database, by executing the scanning program, further security information indicating one or more security vulnerabilities associated with the further database; and
storing the further security information in the repository database.

5. The computer-implemented method of claim 1, wherein
the repository database is accessible via a web interface implemented by the server.

6. The computer-implemented method of claim 1, wherein
the web application is implemented using procedural language extensions to a structured query language.

7. The computer-implemented method of claim 1, further comprising:
executing the scanning program using the web application to scan the plurality of databases for the one or more security vulnerabilities.

8. The computer-implemented method of claim 1, wherein
a subprogram of the one or more subprograms is a procedure or a function, and
the subprogram comprises one or more parameters with differing values.

9. The computer-implemented method of claim 2, wherein
the stored program unit is a procedure, a function, or a package, and
the stored program unit comprises one or more label security privileges associated with the security information.

10. A non-transitory computer readable storage medium comprising program instructions executable to:
connect, by a server, to a database of a plurality of databases;
retrieve from the database, security information indicating one or more security vulnerabilities associated with the database;
scan, by a scanning program implemented in a web application that is hosted by a web server, the database to identify the one or more security vulnerabilities, wherein
the scanning program is configured to execute a single server process facilitated by an application service layer on the web server,
the single server process includes stored program unit commands;
execute, by the scanning program, one or more subprograms stored in the database using the stored program unit commands;
invoke, by the one or more subprograms in the database, one or more stored program units in the database;
access, by the one or more subprograms, the security information using one or more stored program units stored in the database based on the stored program unit commands; and
store the security information in a repository database, wherein
the security information comprises the one or more security vulnerabilities.

11. The non-transitory computer readable storage medium of claim 10, wherein
a stored program unit of the one or more stored program units is used to retrieve a portion of the security information from the database,
the portion of the security information is associated with a security vulnerability of the one or more security vulnerabilities, and
the portion of the security information comprises privilege escalation data, Structural Query Language (SQL) injection data, Transparent Network Substrate (TNS) poison data, system package data, user account data, or database auditing data.

12. The non-transitory computer readable storage medium of claim 10, wherein
the web application is implemented using procedural language extensions to a structured query language.

13. The non-transitory computer readable storage medium of claim 12, further comprising:
executing the scanning program using the web application to scan the plurality of databases for the one or more security vulnerabilities.

14. The non-transitory computer readable storage medium of claim 10, wherein
a subprogram of the one or more subprograms is a procedure or a function, and
the subprogram comprises one or more parameters with differing values.

15. The non-transitory computer readable storage medium of claim 11, wherein
the stored program unit is a procedure, a function, or a package, and
the stored program unit comprises one or more label security privileges associated with the security information.

16. A system comprising:
one or more processors; and
a memory coupled to the one or more processors, wherein the memory stores program instructions executable by the one or more processors to:
connect, by a server, to a database of a plurality of databases;
retrieve from the database, security information indicating one or more security vulnerabilities associated with the database;
scan, by a scanning program implemented in a web application that is hosted by a web server, the database to identify the one or more security vulnerabilities, wherein
the scanning program is configured to execute a single server process facilitated by an application service layer on the web server,
the single server process includes stored program unit commands;
execute, by the scanning program, one or more subprograms stored in the database using the stored program unit commands;
invoke, by the one or more subprograms in the database, one or more stored program units in the database;
access, by the one or more subprograms, the security information using one or more stored program units stored in the database based on the stored program unit commands; and
store the security information in a repository database, wherein
the security information comprises the one or more security vulnerabilities.

17. The system of claim 16, wherein
a stored program unit of the one or more stored program units is used to retrieve a portion of the security information from the database,
the portion of the security information is associated with a security vulnerability of the one or more security vulnerabilities, and
the portion of the security information comprises privilege escalation data, Structural Query Language (SQL)

injection data, Transparent Network Substrate (TNS) poison data, system package data, user account data, or database auditing data.

18. The system of claim 16, wherein
the web application is implemented using procedural language extensions to a structured query language.

19. The system of claim 16, further comprising:
executing the scanning program using the web application to scan the plurality of databases for the one or more security vulnerabilities.

20. The system of claim 16, wherein
a subprogram of the one or more subprograms is a procedure or a function,
the subprogram comprises one or more parameters with differing values,
the stored program unit is a procedure, a function, or a package, and
the stored program unit comprises one or more label security privileges associated with the security information.

* * * * *